(12) United States Patent
Hartmaier et al.

(10) Patent No.: US 6,393,269 B1
(45) Date of Patent: May 21, 2002

(54) SIGNALING SYSTEM AND METHOD FOR NETWORK-BASED PRE-PAID WIRELESS TELEPHONE SERVICE

(75) Inventors: Peter Hartmaier, Woodinville; Michael T. Wilhoite, Redmond, both of WA (US)

(73) Assignee: Openwave Systems Inc., Redwood City, CA (US)

(*) Notice: Subject to any disclaimer, the term of this patent is extended or adjusted under 35 U.S.C. 154(b) by 0 days.

(21) Appl. No.: 09/172,934

(22) Filed: Oct. 14, 1998

(51) Int. Cl.[7] .............................................. H04M 15/00
(52) U.S. Cl. ...................... 455/406; 455/408; 455/435; 455/445; 455/433
(58) Field of Search .................................. 455/405, 406, 455/408, 411, 422, 432, 445, 550, 561, 433, 435; 379/111–115, 118, 120–122, 133–134

(56) References Cited

U.S. PATENT DOCUMENTS

| | | | |
|---|---|---|---|
| 5,359,642 A | | 10/1994 | Castro .......................... 379/121 |
| 5,511,113 A | * | 4/1996 | Tasaki et al. ................ 379/112 |
| 5,517,555 A | * | 5/1996 | Amadon et al. ............. 455/408 |
| 5,592,535 A | * | 1/1997 | Klotz ........................... 455/406 |
| 5,722,067 A | | 2/1998 | Fougnies et al. ............ 455/406 |
| 5,778,313 A | | 7/1998 | Fougnies ..................... 455/406 |
| 5,809,412 A | | 9/1998 | Daurio et al. ................ 455/410 |
| 5,832,382 A | * | 11/1998 | Alperovich .................. 455/433 |
| 5,909,485 A | * | 6/1999 | Martin et al. ................ 455/406 |
| 5,991,616 A | * | 11/1999 | Mirza et al. ................. 455/406 |
| 5,995,822 A | * | 11/1999 | Smith et al. ................. 455/406 |
| 6,044,259 A | * | 3/2000 | Hentila et al. ............... 455/406 |
| 6,058,300 A | * | 5/2000 | Hanson ........................ 455/406 |
| 6,104,792 A | * | 8/2000 | Lautenschlager et al. ... 455/406 |
| 6,131,024 A | * | 10/2000 | Boltz ........................... 455/408 |
| 6,195,543 B1 | * | 2/2001 | Granberg ..................... 455/408 |

FOREIGN PATENT DOCUMENTS

WO 9615633 5/1996 ............ H04Q/3/00

OTHER PUBLICATIONS

European Telecommunications Standards Institute, TS 101 044 V5.2.0 (Nov. 1997), Digital cellular telecommunications system (Phase 2+); Customized Applications for Mobile network Enhanced Logic (CAMEL)—Stage 2 (GSM 03.78 version 5.2.0).

European Telecommunication Standards Institute, ETS 300 374–1, Intelligent Network (IN); Intelligent Network Capability Set 1 (CS1); Core Intelligent Network Application Protocol (INAP); Part 1: Protocol specification, Sep. 1994.

"IS–41 for Mobility Management", International Conference on Universal Personal Communications, US, IEEE, New York, New York, pp. 158–162, XP000494916.

International Search Report, PCT/US99/21119.

* cited by examiner

*Primary Examiner*—Lester G. Kincaid
(74) *Attorney, Agent, or Firm*—Fulbright & Jaworski L.L.P.

(57) ABSTRACT

A pre-paid subscriber account system for use with wireless telephone systems is disclosed. The system, which monitors a subscriber's call, deducts the cost of the call from the subscriber's pre-paid account in real-time, warns the subscriber during a call when the account is nearing depletion, and terminates the call when the account is depleted. The system can also prevent the initiation of a new call when the account is depleted. Various options can also apply different charging rates, can charge only when specified criteria are met, or can charge only for calls to/from specified areas or telephone numbers. The system and method uses signaling techniques that will allow the metering or billing of the call, along with any authorization or restrictions, to be done remotely from the actual switching of the call. Call events or chargeable events are transmitted to the pre-paid control system while the communications path of the call is held at the switching system awaiting control information. The identity of the pre-paid service subscriber is established using existing devices that currently are used to authenticate the user. The wireless phone user does not have to enter any additional codes or identification to obtain -access to the pre-paid service.

16 Claims, 6 Drawing Sheets

SIGNALING SYSTEM AND METHOD FOR NETWORK-BASED PRE-PAID WIRELESS TELEPHONE SERVICE

TECHNICAL FIELD OF THE INVENTION

The invention relates to telephone systems and more particularly to a system and method for charging wireless telephone subscribers for their telephone usage from a subscriber account. In particular, it pertains to a system and method for charging wireless telephone users in real time from a pre-paid account and immediately terminating or restricting their calls when the account balance is depleted.

BACKGROUND OF THE INVENTION

Long distance service companies and wireless telephone companies typically bill their subscribers based on actual calls placed and the duration of those calls. Since unpredictable calling patterns make the total charge for these services unpredictable, they are typically billed to the subscribers at regular intervals after such calls have been made. However, some subscribers are denied this privilege due to their inadequate credit rating. Alternately, some subscribers prefer to control telephone usage by members of their families or others, by limiting calls to a predetermined total cost. It is desirable to be able to provide wireless telephone services for these situations, while reducing exposure to bad debt for the wireless telephone service providers, and reducing exposure to excessive charges for the subscribers. One solution to this problem is to provide pre-paid accounts for wireless telephone service. As telephone charges accrue, they are simply deducted from these accounts. If the subscriber does not maintain an adequate balance, then the wireless telephone services can be wholly or partially disabled or cut off, thereby reducing the financial risk inherent in unrestricted telephone usage.

Two basic strategies are used to provide such pre-paid accounts. The first approach monitors billing records and compares the records with an account balance to determine when the account balance has been depleted, referred to as "Hotbilling".

However, these comparisons are usually made after each phone calls has been completed. The delay between accrual of the telephone service charges and the reduction of the account balance allows subscribers to significantly overrun their account balance during a call. As a result, prepaid subscribers in this type of system may create negative account balances before the service provider detects the overrun and phone service is terminated or blocked. The financial risk for this type of billing system increases as the interval between charge accrual and account reconciliation increases.

An alternative approach provides for trunk-looping the voice channel for prepaid calls through a device that monitors individual calls and calculates costs in real-time. However, this type of system requires the voice channel to be rerouted through the monitoring device, which may be located a great distance away. This rerouting may require a great deal of additional network capacity, and is therefore very expensive for the telephone companies to implement.

An additional limitation of prior art trunk-looping systems is the inability to use such systems when roaming. In the prior art, prepaid calls are routed through a monitoring device that is connected to the calling device's home switch. When the calling device is roaming, the roaming area switch is not connected to the prepaid monitoring device, and, therefore, is unable to provide prepaid service to the caller.

The prior art systems and methods for providing prepaid wireless telephone service have obvious disadvantages. Service providers resist implementing either one due to perceived high costs and/or financial risk due to delayed processing.

SUMMARY OF THE INVENTION

The instant invention solves the aforementioned problems by monitoring the presence of a subscriber's wireless telephone call, determining the accrued cost of the call, and appropriately reducing the account balance, all as the call is taking place. It does so without rerouting voice traffic and can be implemented in an existing mobile switching center (MSC). The invention takes advantage of the MSC's capability to process call handling instructions from an Signaling Control Point (SCP) and to connect an Interactive Voice Response (WR) unit to a call in progress. Based on a predetermined minimum account threshold, the system has the capability of mailing a warning announcement to the subscriber whenever the threshold is being approached, disconnecting the call when the threshold is reached, and preventing further calls until the account balance has been replenished. Other options are also available, such as restricting telephone calls to/from certain telephone numbers, certain calling zones, or certain geographical boundaries.

Replenishment of the account can be accomplished by the subscriber through the use of standard cash, check, or money order payments, through pre-authorized credit card payments, or through the purchase of debit cards from authorized distributors.

A preferred embodiment of the invention is implemented in software in a computer system which can be integrated into existing telephone communications systems for wireless telephones, including cellular and PCS telephones. The present invention is directed to a system and method for communicating the status of a call between the switching system and pre-paid control system. Protocols between the switch and the pre-paid system define specific command and response codes, which are communicated between the various components to permit specific activities to occur across a distributed network. Each of the command and response codes can include various parameters. The instant invention uses additional commands, responses, and parameters within an existing protocol to signal between the switching system and the pre-paid control system to effect network based prepaid service.

One technical advantage of the invention is a system that can monitor the status of calls and adjust the associated account balance in real time so that service can be modified or terminated immediately whenever the funds in the prepaid account are depleted.

Another advantage is that this monitoring is provided without causing the voice channel to be rerouted from its normal path.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE INVENTION

Figure 9:
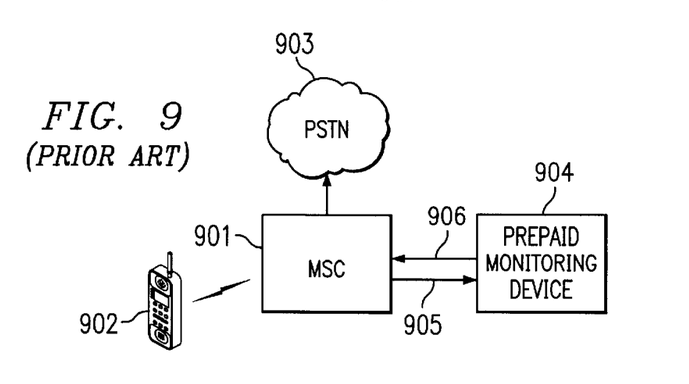
FIG. 9 is a block diagram of a prior art prepaid wireless system.

Before describing the operation of the present invention, it would be instructive to describe the operation of a prior art wireless prepaid monitoring device as shown in FIG. 9. MSC 901 is in communication with wireless device 902, which may be assigned to a prepaid wireless service account. When device 902 initiates outgoing calls to a called number, such as a number in the Public Switched Telephone Network (PSTN) 903, MSC 901 determines that device 902 is assigned to a prepaid account and, therefore, the cost for the call must be compared to the current prepaid account balance. Prepaid monitoring device 904 is used to monitor the cost of the call.

In order to monitor the cost of the call, MSC 901 trunk-loops the call by routing the voice channel for wireless device 902 through monitoring device 904. As a result, the voice channel between device 902 and the called party is increased by links 905 and 906. This trunk-looping may cause delay and noise in the signal path. Additionally, it creates extra equipment and maintenance expense for the service provider.

Figure 1:
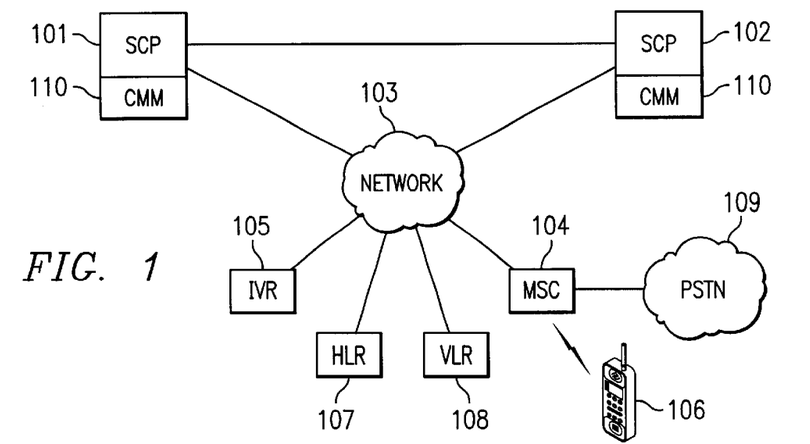
FIG. 1 is a block diagram of a wireless prepaid system employing the present invention.

FIG. 1 is an illustrative example of a communications system embodying the present invention. SCPs 101 and 102 are configured as a redundant pair of processors that perform the prepaid application. SCPs 101, 102 are connected to communications network 103, which may be a Signaling System Seven (SS7) network. MSC 104 is also connected to network 103, which allows MSC 104 to exchange data with SCPs 101 and 102. IVR 105 is also connected to network 103 in such a way as to allow messages and data to be exchanged with SCPs 101 and 102 and MSC 104.

Subscriber unit 106 is in radio communication with MSC 104. Home Location Register (HLR) 107 is a database comprising information associated with the subscriber units that are assigned to MSC 104 as their home switch. When subscriber unit 106 attempts to check-in with MSC 104, the switch will get current configuration data for unit 106 from HLR 107 is unit 106 is homed on MSC 104. If unit 106 is roaming and it is homed on another MSC (not shown), then MSC 104 will obtain unit 106's configuration data from the home HLR (not shown) for subscriber unit 106. Configuration data for roaming subscriber units is stored in Visitor Location Register (VLR) 108.

Once MSC 104 has the configuration data for subscriber unit 106, then MSC 104 can connect unit 106 to called parties through PSTN 109. Alternatively, MSC 104 can route incoming calls from PSTN 109 to subscriber unit 106.

In one embodiment of the present invention, SCPs 101 and 102 include software with appropriate capabilities to provide prepaid calling services. The prepaid calling functionality in SCPs 101 and 102 is referred to herein as a call monitoring module. This functionality can be installed in existing wireless telephone service equipment or can include stand-alone computers especially prepared for this purpose. The call monitoring module can operate in conjunction with existing telephone switching systems, including multiple MSC's, HLR's, and IVR's existing at various geographical locations, to provide the relevant functionality across a wide area in a cost-efficient manner. MSC 104 communicates with wireless devices, such as unit 106, that are within MSC 104's geographical range at the time a call is made. HLRs, such as 107, contains a database for each subscriber, with each subscriber being pre-assigned to a particular HLR.

IVR 105 is capable of playing pre-programmed voice messages and can be connected to subscriber unit 106 by MSC 104 to play a specified voice message. The MSC, HLR, and IVR involved in a particular call typically communicate with each other over a digital network, such as network 103, where each device has a network address. Communications between these various systems can take place through a communications protocol defined in American National Standards Institute section 41 (IS-41).

IS-41 defines a series of commands, responses, and related data that are exchanged between telecommunications devices, in which both the commands and the responses can include the related data. The form of this information can be roughly divided into commands (interdevice requests to perform a function), responses (replies to the command, signaling that the requested function is complete), and parameters (data that can be conveyed within a command or a response, and which denotes specific operations or triggers). Operations are functions that can be performed, while triggers represent status flags that initiate operations. MSC's, HLR's, IVR's and standard IS-41 are well known to those of ordinary skill in the telecommunications industry, and their overall characteristics are not further described here. However, the following detailed descriptions will define how the illustrative example of the present invention interacts with these existing systems in novel and non-obvious ways to provide the desired results, by using specific IS-41 commands, responses, parameters, operations and triggers to communicate with the MSC and IVR.

In the preferred embodiments described, speech paths are not connected to SCPs 101 or 102, thus eliminating the inefficiencies of looping trunks required with other pre-paid applications. Existing MSC's, HLR's, and IVR's perform their normal functions, thus allowing the invention to be integrated into existing systems without a large investment in new resources or the expensive obsolescence of old resources.

When a call is initiated between wireless device 106 and a called party, such as a number in PSTN 109, MSC 104 creates a direct connection between device 106 and PSTN 109, without trunk-looping the voice signal. As part of the call setup, MSC 104 determines that device 106 is associated with a prepaid account. Accordingly, MSC 104 notifies the appropriate SCP, 101 or 102, to begin monitoring the cost of the call. SCP 101 or 102 then begins monitoring the call using a call monitoring module (CMM) 110. MSC 104 provides CMM 110 in SCP 101 or 102 with certain parameters for the call and CMM 110 calculates the running cost of the call. This running cost is deducted from the prepaid account balance. When the call is completed, MSC 104 instructs the appropriate SCP to stop monitoring the call.

If the costs for the call approach or exceed a threshold, then CMM 110 causes MSC 104 to conference IVR 105 into the call path, so that IVR 105 can play an appropriate warning message. CMM 110 can also instruct MSC 104 to terminate the call when the prepaid account balance drops below a preselected amount.

It will be understood in the example illustrated herein that although many of the triggers, detection points, operations and messages described herein are currently part of the IS-41 standard, other triggers, detection points, operations or messages may be added to the IS-41 standard at a later time. Additionally, various ones of the triggers and detection points described herein may be optional features that may be used in a system complying with the IS-41 standard.

To interact correctly with the illustrative call monitoring module in the example system described herein, MSC 104 requires four basic capabilities:

1. The MSC should support the following events:
    origination triggers, "O_Answer" and "O_Disconnect," and
    termination triggers, "T_Answer" and "T_Disconnect."
2. Support of a trigger address list parameter to send Origination Request (ORREQ) messages to the call monitoring module.
3. Allow call bridge and call shut-down capability during a two-way call using Connect Resource and SRFDirective messages (specialized IS-41 messages).
4. Provide the geographic location of a subscriber.

The following descriptions pertain to preferred embodiments using specific parameters that are currently available in known telephone network systems. These parameters and their identifying names are known to those of ordinary skill in the art and are therefore not provided herein with detailed descriptions.

Subscriber Registration

Figure 2:
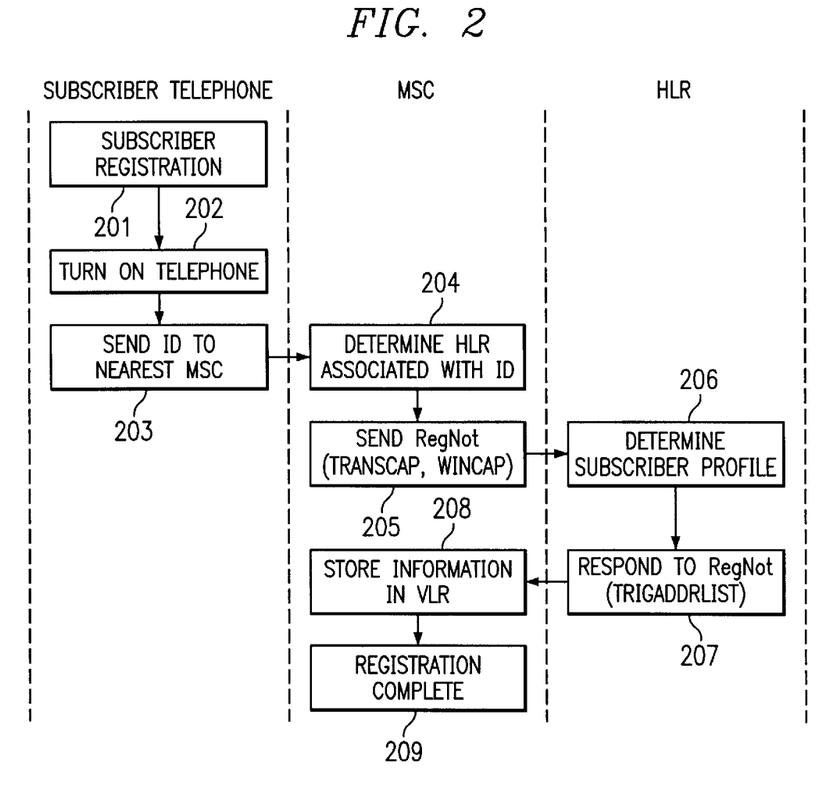
FIG. 2 is a flowchart illustrating subscriber registration in an illustrative example of the present invention.

Registration occurs when a subscriber turns on his or her wireless telephone and establishes a communications link to the nearest MSC. The MSC identifies the specific wireless telephone from its unique address and sets up the appropriate operational data for it that can be used for the duration of the connection. As can be seen in FIG. 2, subscriber registration 201 begins when the wireless telephone is turned on at step 203 and sends its unique identification address to the nearest MSC at step 203. Based on the unique address, the MSC determines which HLR is associated with that particular telephone at step 204 and sends the registration notification command RegNot to that HLR at step 205. The RegNot command specifies the optional triggers that this particular MSC supports. The parameter transcap is included in the command and is set to indicate that the MSC can process a trigger address list. The parameter wincap is also included to indicate which trigger types the MSC supports (like 'Busy' and 'No Answer'), and which operations it supports (like 'Reset Timer', 'Connect Resource', and 'Conference Operations').

The HLR retrieves the subscriber profile database for the identified wireless telephone at step 206, containing information on the capabilities and permitted activities of the subscriber. Given the capabilities of the serving MSC and the features set in the subscriber's profile, the HLR responds to the RegNot command at step 207 with the parameter trigaddrlist, which defines specific trigger types available for this subscriber and the network address of the device associated with each trigger. This information includes data on the call monitoring module of the present invention. In step 208, the MSC stores this information in it's Visitor Location Register (VLR), which is a temporary subscriber database created just for the duration of this call. Registration is complete at step 209, and no other related activities occur until a call to or from the subscriber is attempted.

The call monitoring module does not participate in the subscriber registration sequence. However, this step establishes the existence of the call monitoring module to the MSC, and provides the associated parameters that will permit the MSC to communicate with it.

Call Origination

Typically, monitoring a call originated by a pre-paid subscriber assumes the following conditions:

1. The 'Answer', 'Disconnect' and 'All Calls' triggers were enabled in the VLR during registration,
2. The serving MSC received the network address of the call monitoring module during registration, and
3. The serving MSC supports the Connect Resource operation.

Figure 3:
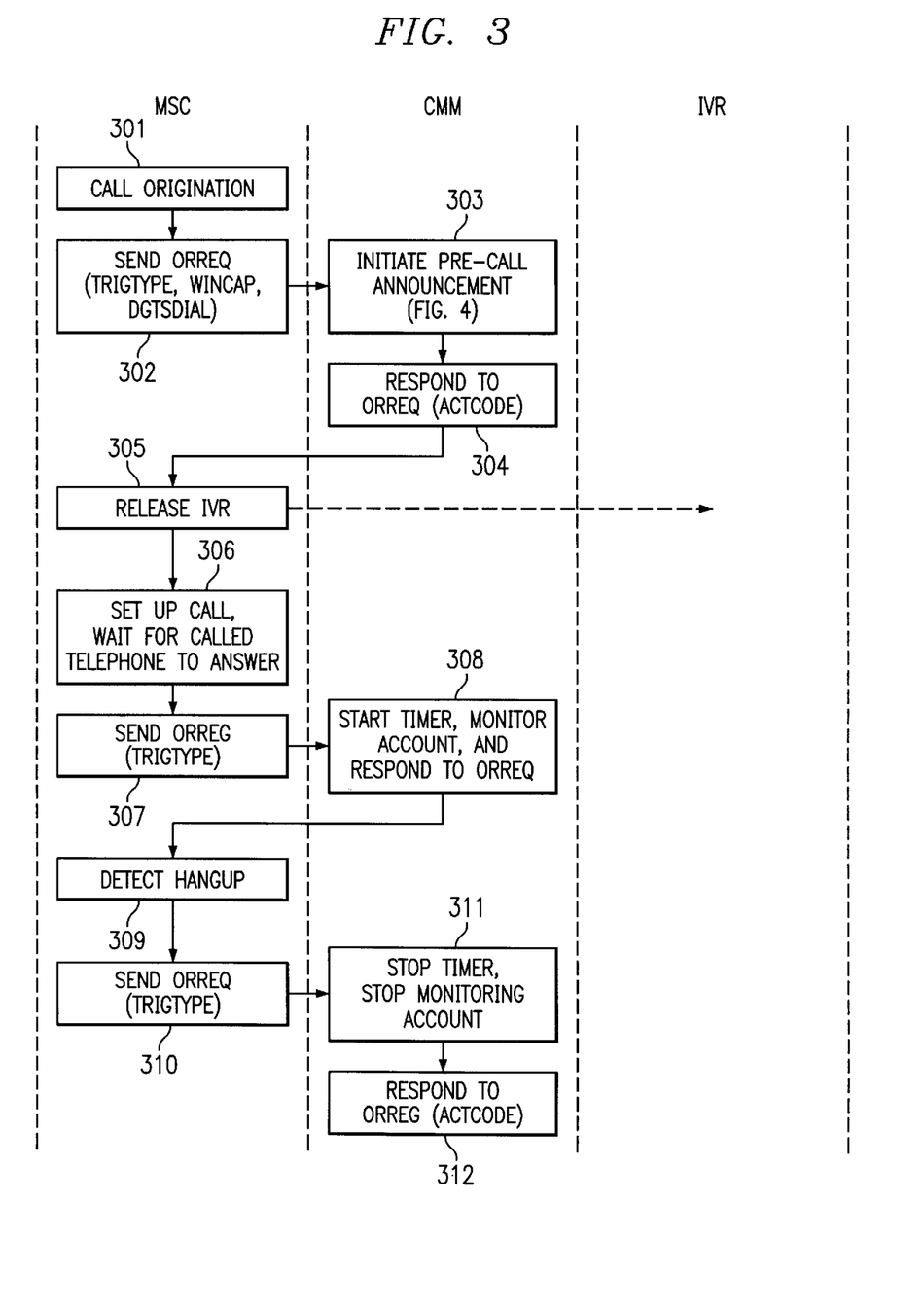
FIG. 3 is a flowchart illustrating call origination in an illustrative example of the present invention.

FIG. 3 shows that the CALL ORIGINATION sequence 301 involves a series of communications between the MSC, the HLR, the call monitoring module (CMM), and the IVR. In one embodiment, the CMM may be embodied as software residing on a SCP, such as SCPs 101 or 102 in FIG. 1. Alternatively, the CMM maybe a function that is performed in the MSC. The process begins when the serving MSC 104 receives a normal call origination signal, with the dialed digits, from subscriber 106. MSC 104 determines that the subscriber has an origination trigger enabled and sends an origination request command (ORREQ) to the call monitoring module (CMM) at step 302. The trigtype parameter indicates why the message was sent by identifying the type of trigger that initiated the message. The wincap parameter indicates that the serving MSC supports the Connect Resource operation. The dgtsdial parameter indicates the telephone number dialed by the subscriber.

If the call monitoring module determines that an announcement must be played to the subscriber before placing the call, the call monitoring module initiates the PLAY ANNOUNCEMENT communications sequence at step 303. The sequence for making an announcement is described in FIG. 4.

Figure 4:
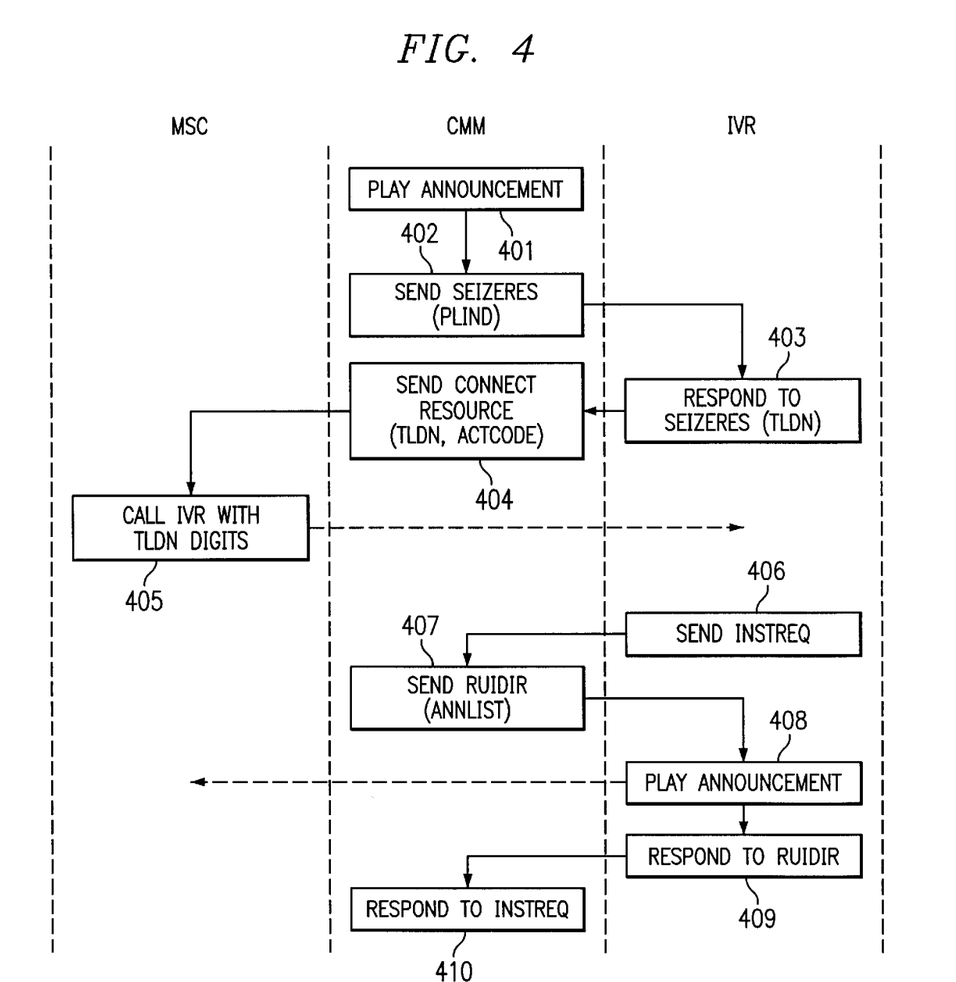
FIG. 4 is a flowchart illustrating how warning announcements are played in an illustrative example of the present invention.

As shown in FIG. 4, the PLAY ANNOUNCEMENT sequence begins 401 when the call monitoring module sends a Seize Resource command (SEIZERES) to the associated IVR at step 402. This command includes the parameter plind (preferred language indicator) to specify the language (English, Spanish, French, etc.) of any announcement to be made to the subscriber. When the IVR receives this command, it's response to the call monitoring module at step 403 includes the parameter tldn (temporary local directory number), which specifies a dial-up telephone number by which the IVR can be connected for voice communications. The call monitoring module then sends a Connect Resource command to the MSC with the tldn parameter at step 404.

The MSC uses this information to call the IVR and establish a voice connection with it at step 405. Once this call is placed, the IVR sends an instruction request (INSTREQ) at step 406 to the call monitoring module requesting call processing instructions. The call monitoring module sends an RUIDIR command to the IVR at step 407, with the announcement parameter annlist indicating which announcement to play.

The IVR plays the indicated announcement at step 408 over the dialed-up connection to the MSC, which passes the announcement through to the subscriber's telephone. Once the announcement is complete, the IVR and call monitoring module bring the INSTREQ and RUIDIR command sequences to a close by sending the proper responses to each other at steps 409 and 410. The interaction with the IVR before and after the call is prior art known to those in the wireless industry. The interaction with an IVR while a call is in progress is novel with this invention.

Returning to FIG. 3, once the announcement of step 303 is complete, the call monitoring module then responds to the ORREQ command from the serving MSC at step 304, providing an action code parameter actcode, which tells the MSC to drop the dialup connection to the IVR at step 305, and establish a new call using the routing digits previously provided by the subscriber. The MSC places the subscriber's requested call at step 306, using known procedures which are not described here. When the MSC detects an answer, it determines that the subscriber has the answer trigger enabled and sends an ORREQ command to the call monitoring module at step 307. The trigtype parameter is set to indicate "Answer". At step 308, the call monitoring module then starts a call timer, begins monitoring the subscriber's account, and responds to the ORREQ command from the MSC. At this point, the call is connected and no further communication with the call monitoring module is necessary until the call ends or the call monitoring module initiates a new action.

When the call is complete, the serving MSC detects a disconnect at step 309, determines that the subscriber has the disconnect trigger enabled and sends another ORREQ to the call monitoring module at step 310. The trigtype parameter is now set to indicate "Disconnect". At step 311, the call monitoring module stops the call timer, stops monitoring the subscriber account, and responds to the ORREQ command at step 312, using an actcode parameter that tells the MSC to disconnect all parties.

During the call setup, if the serving MSC detects "busy" or "no answer" (not shown), it can send an ORREQ command to the call monitoring module with a trigtype parameter indicating that condition. The call monitoring module may respond with an action code parameter and a termination list parameter to redirect the call, possibly to the IVR to play an appropriate announcement to the subscriber.

Subscriber Exhausts Account During Call

Figure 5:
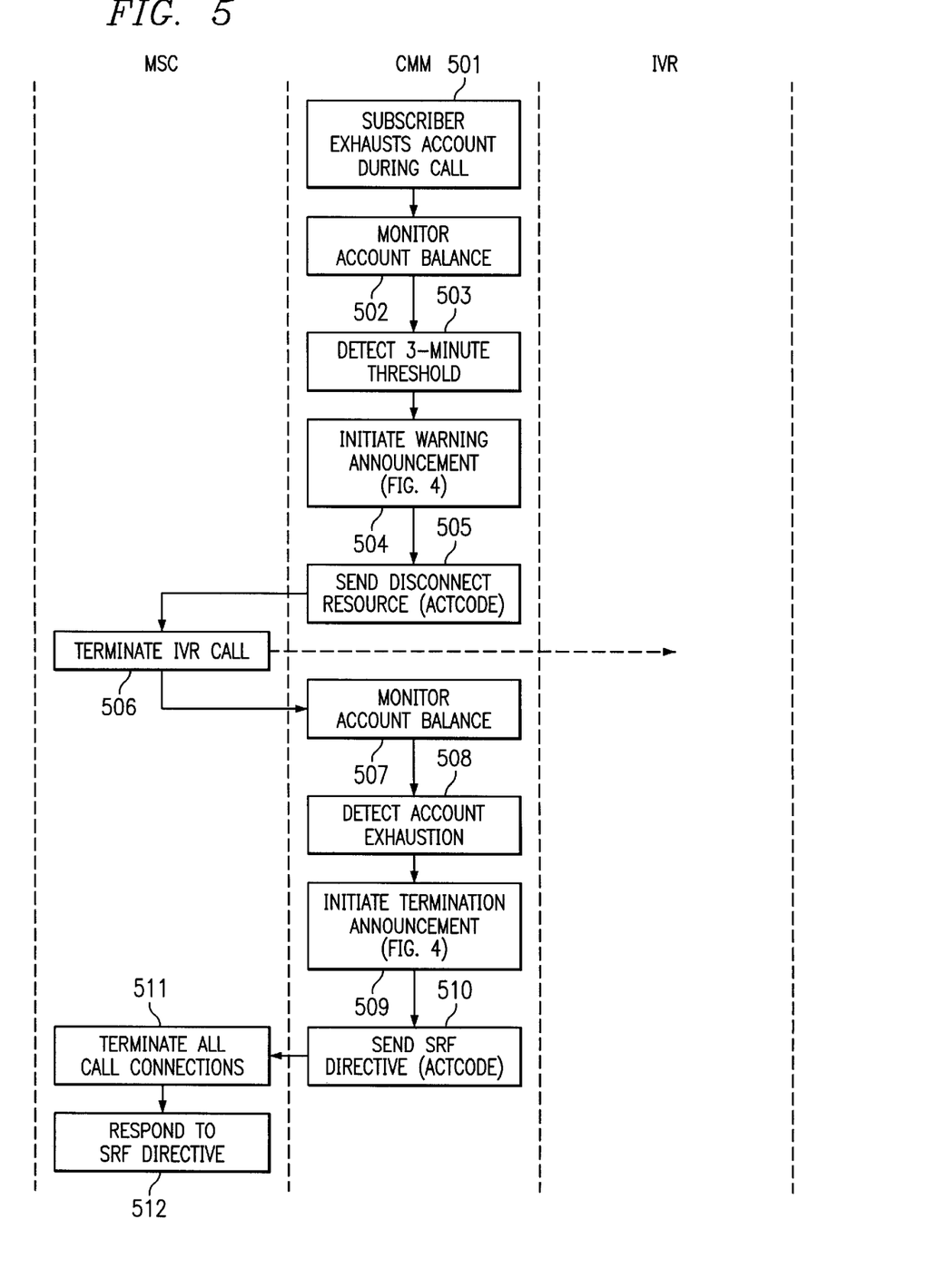
FIG. 5 is a flowchart illustrating how the illustrative example of the present invention operates when the subscriber exhaust the prepaid account balance.

FIG. 5 shows the communications sequence followed when a subscriber depletes his or her account balance during a call. This sequence assumes that the serving MSC supports the conference capability, that the subscriber has originated a call, and that the call is currently active when the call monitoring module account is completely depleted, or exhausted step 501.

The call monitoring module can provide advance warning to the subscriber that the account balance is nearing exhaustion by playing a message that a predetermined number of minutes (for example, three minutes) are available before the call will be disconnected. This determination is typically based on the charging rate and various other relevant data.

During a call, the call monitoring module monitors the account balance at step 502 by periodically subtracting the correct amount and examining the resulting balance. When the warning threshold is detected by the call monitoring module at step 503, the call monitoring module initiates a warning announcement to the subscriber at step 504. This follows the procedure previously described for FIG. 4, except that the annlist parameter of step 407 specifies a 'warning' announcement. When the announcement sequence is complete, the call monitoring module then sends a DISCONNECT RESOURCE command to the MSC at step 505, with an actcode parameter telling the MSC to disconnect the conference call connection to the IVR at step 506, while leaving the connection between the parties intact. This completes the warning message to the subscriber, and processing returns to normal account balance monitoring at step 507.

Once the call monitoring module determines that the account balance has been exhausted at step 508, it initiates a termination message at step 509 to tell the subscriber the call is being terminated. This follows the sequence previously described for FIG. 4, except that the annlist parameter of step 407 specifies the 'termination' message be played to the subscriber. Once the announcement has been made, the call monitoring module sends the MSC an SRF DIRECTIVE command at step 510, with an actcode parameter telling the MSC to disconnect all parties. The MSC does this at step 511 and responds to the SRF DIRECTIVE command at step 512 to end the sequence. Once the subscriber is disconnected, any relevant timers in the call monitoring module are stopped and account balance monitoring is terminated. The subscriber must now replenish the account balance before he or she will be allowed to place or receive any more restricted calls associated with this account.

Call Delivery

Figure 6:
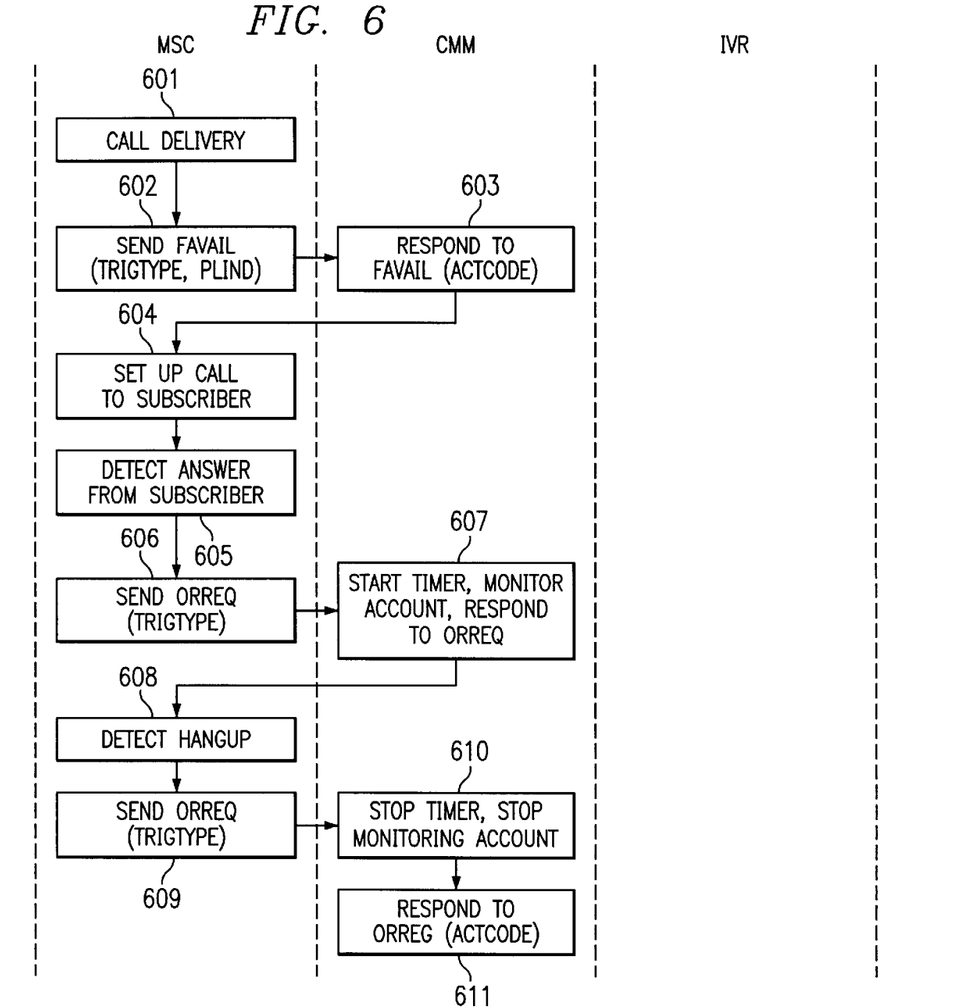
FIG. 6 is a flowchart illustrating call delivery in an illustrative example of the present invention.

Wireless telephone users are also billed for incoming calls. FIG. 6 shows the sequence followed to process incoming calls. This process assumes that:

1. The serving MSC supports the conference capability,
2. The 'answer', 'disconnect' and 'favail' triggers were set in the VLR during registration,
3. The serving MSC received the network address of the call monitoring module during registration,
4. The serving MSC supports the Connect and Disconnect Resource operations,
5. The serving MSC supports the Facility Selected and Available (FAVAIL) trigger.

The first step in this process is for the home MSC, which serves the originator's wireless telephone, to establish a connection to the serving MSC, which serves the subscriber's wireless telephone. This step follows procedures which are known to those of ordinary skill in the art, and a detailed description is therefore not included here. These procedures establish that the subscriber's telephone is turned on and has registered with the serving MSC. Once this has been established, CALL DELIVERY process 601 starts when the serving MSC sends a Facility Selected and Available (FAVAIL) command to the call monitoring module at step 602, with a trigtype parameter indicating an incoming call, and a plind parameter indicating the preferred language of any potential voice messages.

If the call monitoring module determines the subscriber has a sufficient account balance to accept the call, it responds to the FAVAIL command at step 603 by returning an actcode parameter that indicates 'continue processing'. The serving MSC then sets up the call at step 604. If the serving MSC detects an answer by the subscriber's telephone at step 605, it sends an ORREQ command to the call monitoring module at step 606, with a trigtype parameter indicating 'Answer'. At step 607, the call monitoring module then starts the timer, begins monitoring the subscriber account balance, and responds to the ORREQ command. At this point, processing continues in a normal manner for a connected call, with no further communications between the MSC and call monitoring module until the call is ended by the parties. When the parties hang up, the MSC detects this at step 608, and send an ORREQ command to the call monitoring module at step 609 with a trigtype parameter indicating 'disconnect'. The call monitoring module then stops the call timer and the account balance monitoring at step 610, and responds to the ORREQ command at step 611 to end the processing for this sequence.

After receiving the FAVAIL command described above, if the call monitoring module determines that the subscriber does not have a sufficient account balance to accept the incoming call, the call monitoring module can respond to the FAVAIL command at step 603 with an actcode parameter that indicates 'block the call', which the serving MSC can do using standard procedures to indicate to the caller that the dialed party is unavailable. The call monitoring module will normally terminate processing at this point, without any further communication to the serving MSC or IVR.

Error Handling and Fraud Prevention

The call monitoring module can also provide options for unusual situations, such as periodically checking to make sure that both parties are still connected. If the other party has hung up but the subscriber has inadvertently left his wireless telephone connected, he might unknowingly be charged for a continuing telephone call that could deplete the entire account.

Figure 7:
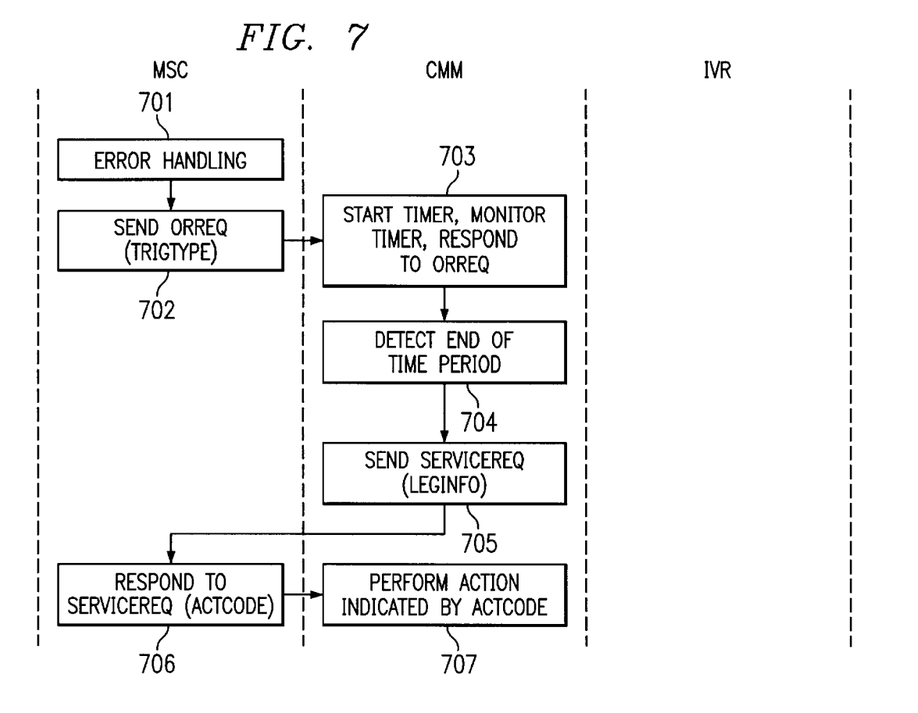
FIG. 7 is a flowchart illustrating error handling in an illustrative example of the present invention.

As shown in FIG. 7, ERROR HANDLING 701 establishes a call as usual at steps 702 and 703, but at periodic intervals detected at step 704, the call monitoring module can send a service request command (SERVICEREQ) to the MSC at step 705. The command can contain the information request parameter leginfo, requesting the current state of the call. If the call is still connected at both ends, the serving MSC can so indicate by responding at step 706 with an actcode parameter indicating 'continue processing'. If the other party has disconnected, the serving MSC can so indicate by returning an actcode parameter indicating 'disconnect call'. In either case, the MSC will then follow the prescribed action at step 707.

Figure 8:
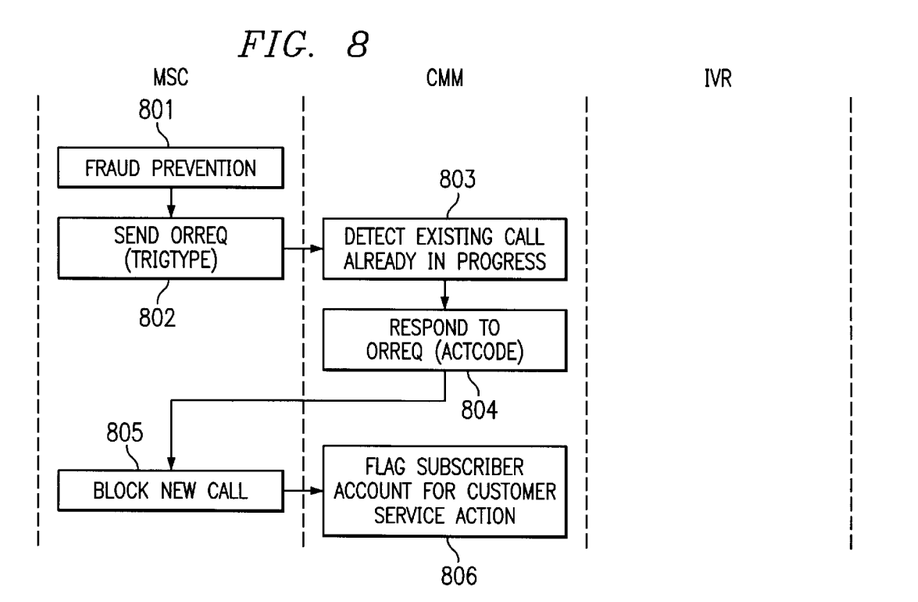
FIG. 8 is a flowchart illustrating fraud prevention in an illustrative example of the present invention.

FIG. 8 shows how the system can be used to detect and prevent some types of fraud, as described for FRAUD PREVENTION 801. The call monitoring module can provide an optional service that automatically detects attempts to use the subscriber's account if a call is already in progress. When the MSC sends an ORREQ command at step 802 to initiate a call using the subscriber's account, the call monitoring module may detect the account is already in use at step 803. If this is detected, the call monitoring module can respond to the ORREQ command at step 804 with an actcode parameter that tells the MSC to block the new call (and possibly to terminate the current call) at step 805. At step 806, the MSC can then flag the account to call customer service or security personnel. In a similar manner, the call monitoring module can be programmed to compare current usage patterns to previous usage patterns. If a significant variation in previous calling patterns is detected, the account can be disabled, and the account flagged to customer service to notify the subscriber.

Telephone service providers may define administration level security that allows authorized personnel to view or modify subscriber attributes. For example, one log-in password might provide view-only capability, while a second log-in password could provide the ability to modify the account balance.

Call Rating

The call monitoring module can contain easily maintained rating engines which determine the access fee (either by month, week or day), the per minute charges for air time usage, toll charges, and the definition of the "local calling area." The local calling area may be defined by area code, area code +local exchange, or mileage from the home area. All rating can be real-time based on MSC triggers and pre-defined rating tables.

The call monitoring module's ability to handle different rate tables is limited only by the serving MSC's ability to identify the current location of the subscriber and the dialed digits. Each subscriber has a class of service that indexes the rate tables, and these tables can be used in many ways to customize the charging profile for each subscriber. The same rating tables can be used when originating or terminating a call. The call monitoring module can be instructed not to charge for incoming calls that last less than a predetermined time or for calls from specified numbers. Tolls for call origination to numbers like voicemail or customer service can be configured as toll-free.

The call monitoring module can also establish separate weekend and holiday rates and provide free minutes and free numbers. Both the number of free minutes and the time frame in which they are offered are variables within the rate plan schedules. Different rates may be applied to the same call, for example, first minute free, or reduced rate after 15 minutes of connect time.

Long distance rates can be based on day, evening, night, mileage, interstate, intrastate, local access transport area (LATA), and/or international tables. Long distance charges can be automatically deducted from subscriber accounts. Federal, state, local, city, county and special taxes may be applied to connection fees, calls, and service, and may be automatically deducted from the account.

Monthly Access and Reactivation Fees

A class of service attribute in the subscriber profile can define access fees. The call monitoring module can automatically deduct periodic charges from the account at programmable intervals (i.e., daily, weekly, monthly).

One-time 'event' charges, such as reactivation fees, may be automatically invoked by customer service by changing a flag in the subscriber profile. If the selected event flag is set, the call monitoring module can immediately deduct a predefined fee from the account.

Calling Restrictions

The call monitoring module can provide the capability to limit the outbound dialing capabilities of accounts at the subscriber level. Outbound calling restrictions can be set for international, interstate, and/or intrastate long distance, or a combination of these in specified area code and area code+ local exchange combinations. If a subscriber has only a few numbers they want to be able to call, the numbers can be placed in a closed user group, and only calls to those numbers will be allowed. Alternatively, the call monitoring module can provide the capability to debit accounts only when subscribers call outside of the closed user group.

If a subscriber has only a few numbers they want to receive calls from, the numbers can be placed in an in-bound closed user group, and only calls from those numbers will be connected.

The aforementioned descriptions are intended to be illustrative and not restrictive. Obvious variations will occur to those of skill in the art and are intended to be encompassed by the disclosed invention, which is limited only by the scope and spirit of the appended claims.

Although the present invention and its advantages have been described in detail, it should be understood that various changes, substitutions and alterations can be made herein without departing from the spirit and scope of the invention as defined by the appended claims.

What is claimed is:

1. A method for using intelligent network triggers to monitor calls associated with subscribers in a wireless intelligent network, wherein the subscribers communicate with Mobile Switching Centers (MSCs) in the wireless intelligent network, and wherein the subscribers are associated with a call monitoring module, the method comprising:
   registering a subscriber with an MSC, wherein, as part of the registration process, the MSC identifies a Home Location Register and at least one call monitoring module associated with the subscriber;
   sending a first command to the call monitoring module when the subscriber has initiated a call;
   connecting the subscriber to a called party using the dialed digits;
   sending a second command to the call monitoring module when the called party answers; and
   sending a third command to the call monitoring module when the connection between the subscriber and the called party is disconnected;
   wherein, following the second command, the call monitoring module performs the steps of:
      monitoring an account balance for the subscriber; and
      periodically requesting status information from the MSC regarding the connection between the subscriber and the called party.

2. The method of claim 1 wherein, following the first command, the call monitoring module performs the steps of:
   directing the MSC to connect to a voice message unit; and
   directing the voice messaging unit to play a message; and
   wherein the MSC routes the message to the subscriber.

3. The method of claim 1 wherein, following the second command, the call monitoring module performs the steps of:
   monitoring an account balance for the subscriber;
   directing the MSC to connect to a voice message unit when the account balance falls below a certain amount; and
   directing the voice messaging unit to play a warning message; and
   wherein the MSC performs the steps of:
      routing the message to the subscriber without disrupting the connection between the subscriber and the called party; and
      disconnecting from the voice message unit.

4. The method of claim 1 wherein, following the second command, the call monitoring module performs the steps of:
   monitoring an account balance for the subscriber
   determining when the account balance is at or below a minimum amount;
   directing the MSC to connect to a voice message unit;
   directing the voice messaging unit to play a call termination message; and
   after the termination message has been played, directing the MSC to disconnect the connection between the subscriber and the called party; and
   wherein the MSC performs the steps of:
      routing the message to the subscriber without disrupting the connection between the subscriber and the called party; and
      disconnecting the connection between the subscriber and the called party when directed by the call monitoring module.

5. The method of claim 1 wherein the call monitoring module performs the steps of:
   receiving a command indicating that a second subscriber has initiated a call;
   determining that the second subscriber has identified an account that is already being monitored for a call in progress; and
   directing the second subscriber's MSC to terminate the call initiated by the second subscriber.

6. The method of claim 1 further comprising the steps of:
   terminating the account balance monitoring when the MSC indicates that the called party has disconnected from the connection.

7. The method of claim 1, wherein the call monitoring module is embodied as software running on a Service Control Point (SCP).

8. The method of claim 1, wherein the call monitoring module functions are performed in the MSC.

9. A method for using intelligent network triggers to monitor calls associated with subscribers in a wireless intelligent network, wherein the subscribers communicate with Mobile Switching Centers (MSCs) in the wireless intelligent network, and wherein the subscribers are associated with a call monitoring module, the method comprising:
   registering a subscriber with an MSC, wherein, as part of the registration process, the MSC identifies a Home Location Register and at least one call monitoring module associated with the subscriber;
   connecting the subscriber to a called party using the dialed digits;
   sending a command from the MSC to the call monitoring module when the called party answers;
   monitoring, by the call monitoring module, of an account balance for the subscriber during the course of a call connection between the subscriber and the called party;
   periodically requesting status information from the MSC regarding the connection between the subscriber and the called party; and
   terminating the account balance monitoring when the MSC indicates that the called party has disconnected from the connection.

10. The method of claim 9 wherein the call monitoring module performs the steps of:
    directing the MSC to connect to a voice message unit when the account balance falls below a certain amount; and
    directing the voice messaging unit to play a warning message; and
    wherein the MSC performs the steps of:
       routing the message to the subscriber without disrupting the call connection between the subscriber and the called party; and
       disconnecting from the voice message unit after the message has been played for the subscriber.

11. The method of claim 9 wherein the call monitoring module performs the steps of:
    determining when the account balance is at or below a minimum amount;
    directing the MSC to connect to a voice message unit;

directing the voice messaging unit to play a call termination message; and after the termination message has been played, directing the MSC to disconnect the connection between the subscriber and the called party; and wherein the MSC performs the steps of:

routing the message to the subscriber without disrupting the connection between the subscriber and the called party; and disconnecting the connection between the subscriber and the called party when directed by the call monitoring module.

12. The method of claim 9 wherein the call monitoring module performs the steps of:

receiving a command indicating that a second subscriber has initiated a call;

determining that the second subscriber has identified an account that is already being monitored for a call in progress; and directing the second subscriber's MSC to terminate the call initiated by the second subscriber.

13. A system for monitoring the running cost of calls for a wireless telephone subscriber that is in communication with a Mobile Switching Center (MSC) in a wireless network, comprising:

a call monitoring module resident on a Service Control Point that is separate from the MSC;

means for sending a first signaling message to the call monitoring module when the subscriber initiate an outgoing call, wherein the call monitoring module is capable of temporarily connecting an Interactive Voice Response (IVR) unit to the subscriber for the purpose of playing announcements to the subscriber;

means for sending a second signaling message to the call monitoring module when the outgoing call has been connected to a called party, wherein said second signaling message causes the call monitoring module to monitor the running cost of the call and to adjust a subscriber account balance based upon the running cost of the call;

means for receiving status requests from the call monitoring module regarding the status of the connection between the subscriber and the called party; and means for sending a third signaling message to the call monitoring module when the MSC indicates that the call has been disconnected.

14. The system of claim 13 further comprising:

means for sending a fourth signaling message to the call monitoring module when the subscriber receives an incoming call, wherein the call monitoring module is capable of temporarily connecting the Interactive Voice Response (IVR) unit to the subscriber for the purpose of playing announcements to the subscriber;

means for sending a fifth signaling message to the call monitoring module when the incoming call has been connected to the subscriber, wherein the call monitoring module adjusts the subscriber's account balance based upon a running cost of the call.

15. The system of claim 13 wherein the signaling messages are messages that comply with the IS-41 standard.

16. The system of claim 13 further comprising:

means, at said call monitoring module, for detecting when two separate calls are associated with a same subscriber account; and means for sending a sixth signaling message from the call monitoring module to the MSC when two calls are associated with the same subscriber account, the sixth signaling message directing the MSC to drop at least one of the calls.

* * * * *

UNITED STATES PATENT AND TRADEMARK OFFICE
CERTIFICATE OF CORRECTION

PATENT NO.    : 6,393,269 B1
DATED         : May 21, 2002
INVENTOR(S)   : Peter Hartmaier et al.

It is certified that error appears in the above-identified patent and that said Letters Patent is hereby corrected as shown below:

<u>Column 2,</u>
Line 19, delete "mailing" and insert -- making -- therefor.

Signed and Sealed this

Fifth Day of August, 2003

JAMES E. ROGAN
*Director of the United States Patent and Trademark Office*